United States Patent [19]

Bontly

[11] Patent Number: 5,042,821
[45] Date of Patent: Aug. 27, 1991

[54] SEAL FOR OPTICAL SCANNER WINDOW

[75] Inventor: Craig H. Bontly, Eugene, Oreg.

[73] Assignee: Spectra-Physics, Inc., San Jose, Calif.

[21] Appl. No.: 582,994

[22] Filed: Sep. 14, 1990

Related U.S. Application Data

[63] Continuation of Ser. No. 305,521, Feb. 2, 1989.

[51] Int. Cl.⁵ .......................... F16J 15/10; G06K 7/14
[52] U.S. Cl. ...................................... 277/12; 235/462; 359/513
[58] Field of Search .................. 350/589, 590; 277/12; 235/462, 467, 470

[56] References Cited

U.S. PATENT DOCUMENTS

| | | | |
|---|---|---|---|
| 3,896,589 | 7/1975 | Mitchell | 49/DIG. 1 X |
| 4,454,686 | 6/1984 | Stapenell | 49/485 X |
| 4,466,221 | 8/1984 | Couture | 49/DIG. 1 X |
| 4,479,656 | 10/1984 | Collins | 277/135 |
| 4,656,344 | 4/1987 | Mergenthaler et al. | 235/462 |
| 4,687,127 | 8/1987 | Pardo et al. | 277/12 |
| 4,700,656 | 10/1987 | Cone et al. | 235/462 |
| 4,794,240 | 12/1988 | Schorr et al. | 235/462 X |
| 4,826,096 | 5/1989 | Bailey et al. | 242/60 |

Primary Examiner—William A. Cuchlinski, Jr.
Assistant Examiner—Scott Cummings
Attorney, Agent, or Firm—Lyon & Lyon

[57] ABSTRACT

A window seal for a bar code laser scanner comprising a silicone foam gasket to form a flexible, soft, durable, compressible and hydrophobic seal between the bar code laser scanner chassis window and the top window on a bar code laser scanner.

8 Claims, 5 Drawing Sheets

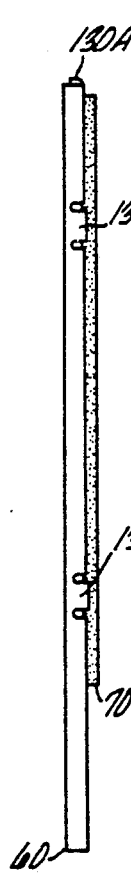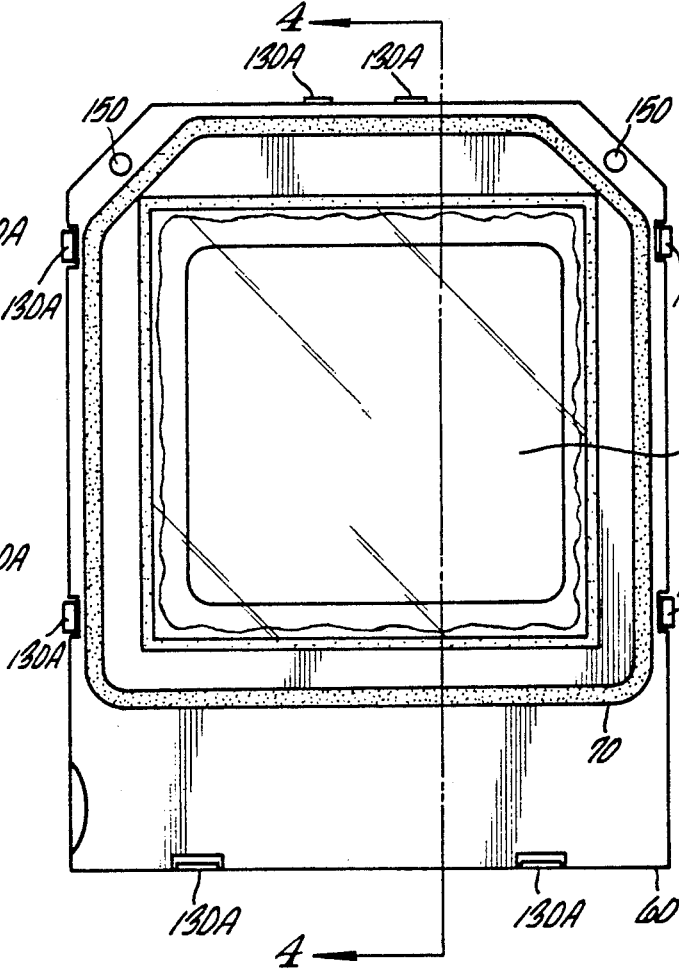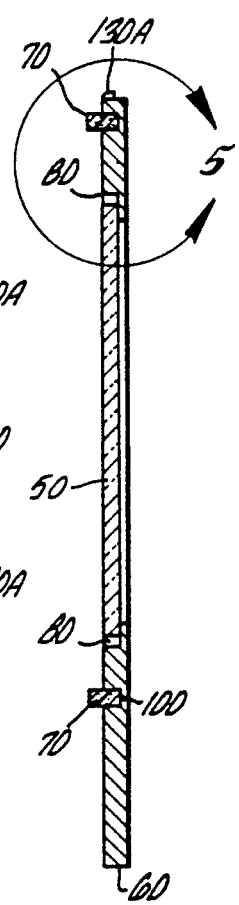

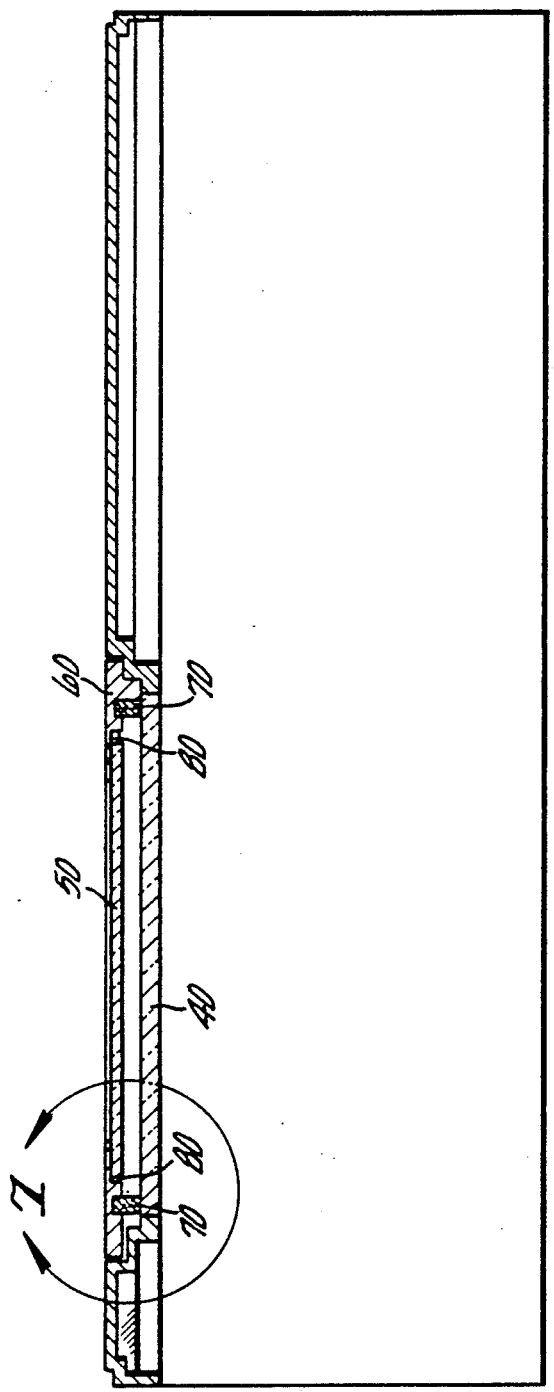
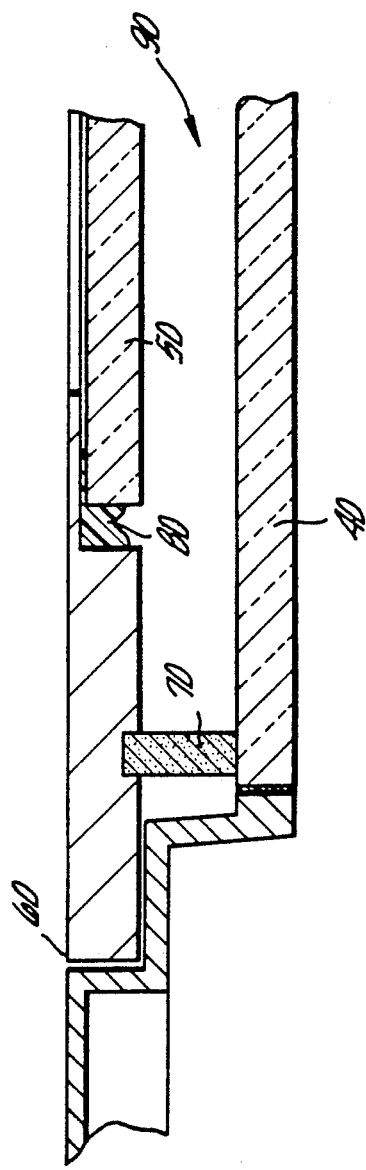

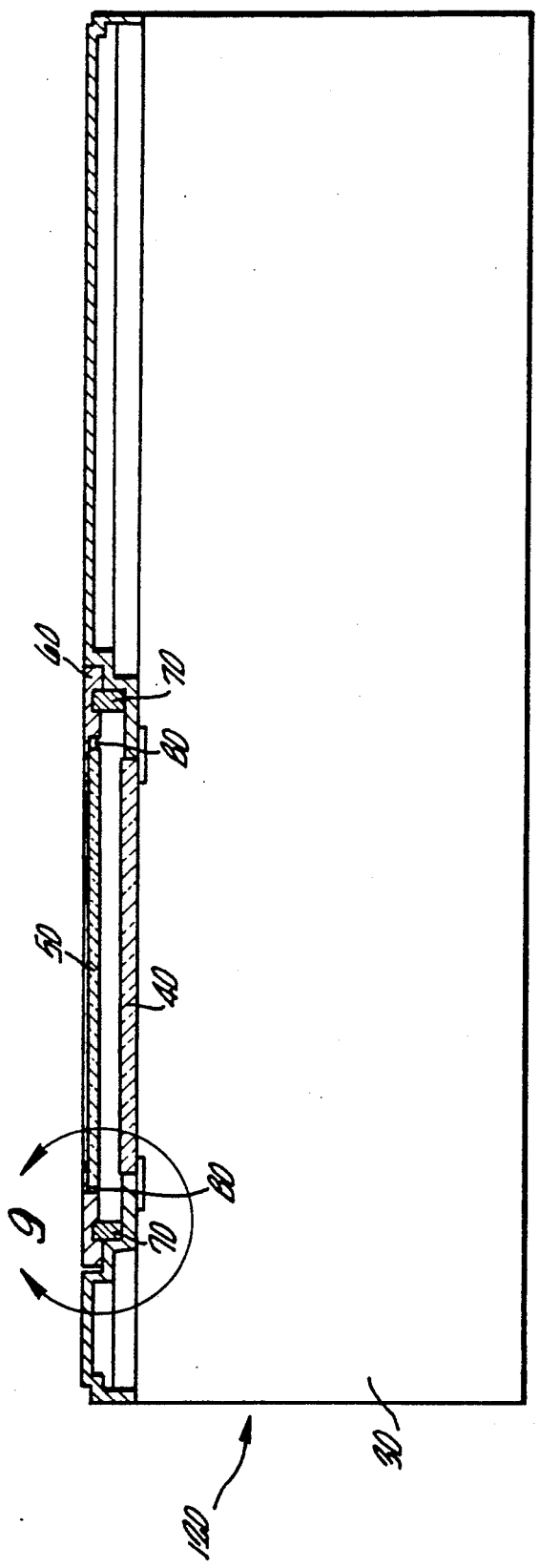
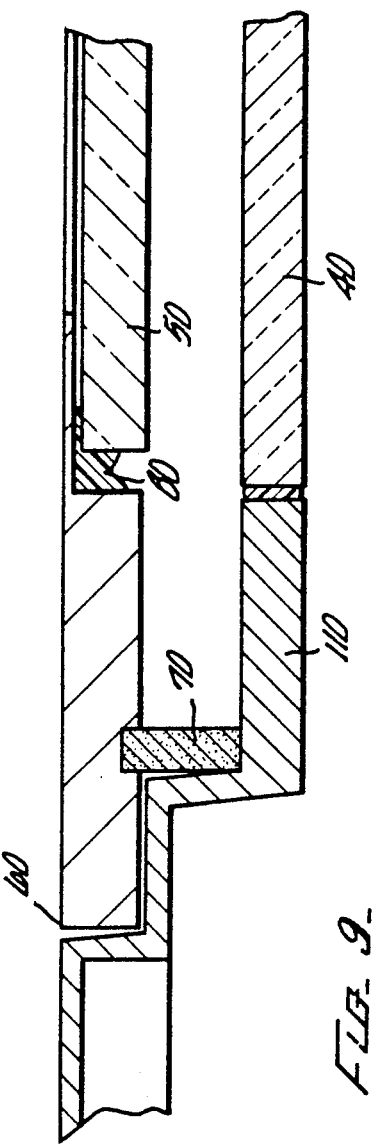

SEAL FOR OPTICAL SCANNER WINDOW

This is a continuation of application Ser. No. 305,521 filed 2/2/89.

BACKGROUND OF THE INVENTION

1. Field of the Invention

This invention relates to the field of optical scanning and particularly to bar code laser scanners. More particularly it relates to an apparatus and method for sealing the optical surfaces of bar code laser scanners from spilled liquids and other contaminants to which such scanners may be exposed in normal use in a point of sale environment such as a supermarket.

2. Description of Related Art

Supermarket scanners, referred to herein as bar code laser scanners, typically consist of a lower chassis which houses the optical scan line generating elements, a lower sealed window through which the scan lines may pass which is sealed to the chassis, and an upper window which is removable and field replaceable, for example, upon being scratched or broken. In order for the scanner to operate in an optimal fashion, both windows must be optically transparent and free of scratches, smears, discolorations and other contaminants which would prevent the scanner light beam from passing unimpeded through the windows as possible. This invention relates to a method and apparatus for sealing the space or gap between the lower window and the upper window from contaminants. The distance between the glass windows has high variability and commercial glass varies in thickness and flatness. This presents a requirement for a device capable of sealing the prevailing gap and excluding liquids and dust. Prior art windows have lacked adequate sealing to keep contaminants away from the lower window. If contaminants slip by the upper window, the lower window must then be cleaned which is frequently difficult, time consuming, and reduces machine availability.

SUMMARY OF THE INVENTION

The present invention comprises a cassette-type upper window carrier to which is permanently affixed and sealed a window. A ribbon type seal extends from the cassette to the lower window which is bonded to a chassis and effects a seal which is effective at keeping contaminants spilled on the machine from reaching the lower window.

Accordingly, it is an object of this invention to provide an improved seal for an optical scanner window.

It is a further object of this invention to provide an improved method for sealing an optical scanner window.

It is a further object of the invention to provide a cassette-type upper window carrier having a ribbon seal for sealing to a chassis.

Other and further objects and advantages of the present invention will appear hereinafter.

BRIEF DESCRIPTION OF THE DRAWINGS

FIG. 2 is a bottom view of a removable top window assembly according to the present invention.

FIG. 3 is a side view of a removable top window assembly according to the present invention.

FIG. 4 is a cross-sectional view taken along lines A—A of FIG. 2.

FIG. 6 is a cross-sectional view of a first preferred embodiment of the scanner top plate with top window assembly inserted as it would appear attached to a typical scanner.

FIG. 7 is an enlarged cross-sectional view of area C of FIG. 6.

FIG. 8 is a cross-sectional view of a second preferred embodiment of the scanner top plate with top window assembly inserted as it would appear attached to a typical scanner.

FIG. 9 is an enlarged cross-sectional view of area D of FIG. 8.

DESCRIPTION OF THE PREFERRED EMBODIMENT

The present invention relates generally to a window seal for use in an optical scanner. Optical scanners are used, for example, in supermarkets to read Universal Product Code information from product tags. It is desirable to seal the space between the lower window of an optical scanner and the upper window so that contaminants are inhibited from entering that space and blocking or impeding the transmission of light rays from within the scanner to without. In a preferred embodiment of the present invention the window seal may be employed in a Spectra-Physics, Inc. Model 750-SL bar code laser scanner available from the Spectra-Physics, Inc. Retail Systems Division, 959 Terry Street, Eugene, Oreg. 97402-9120. It is to be understood, however, that the window seal of the present invention can be used in many situations where it is desirable to create a non-hermetic seal resistive to the passing of contaminants between two parallel surfaces.

Figure 1:
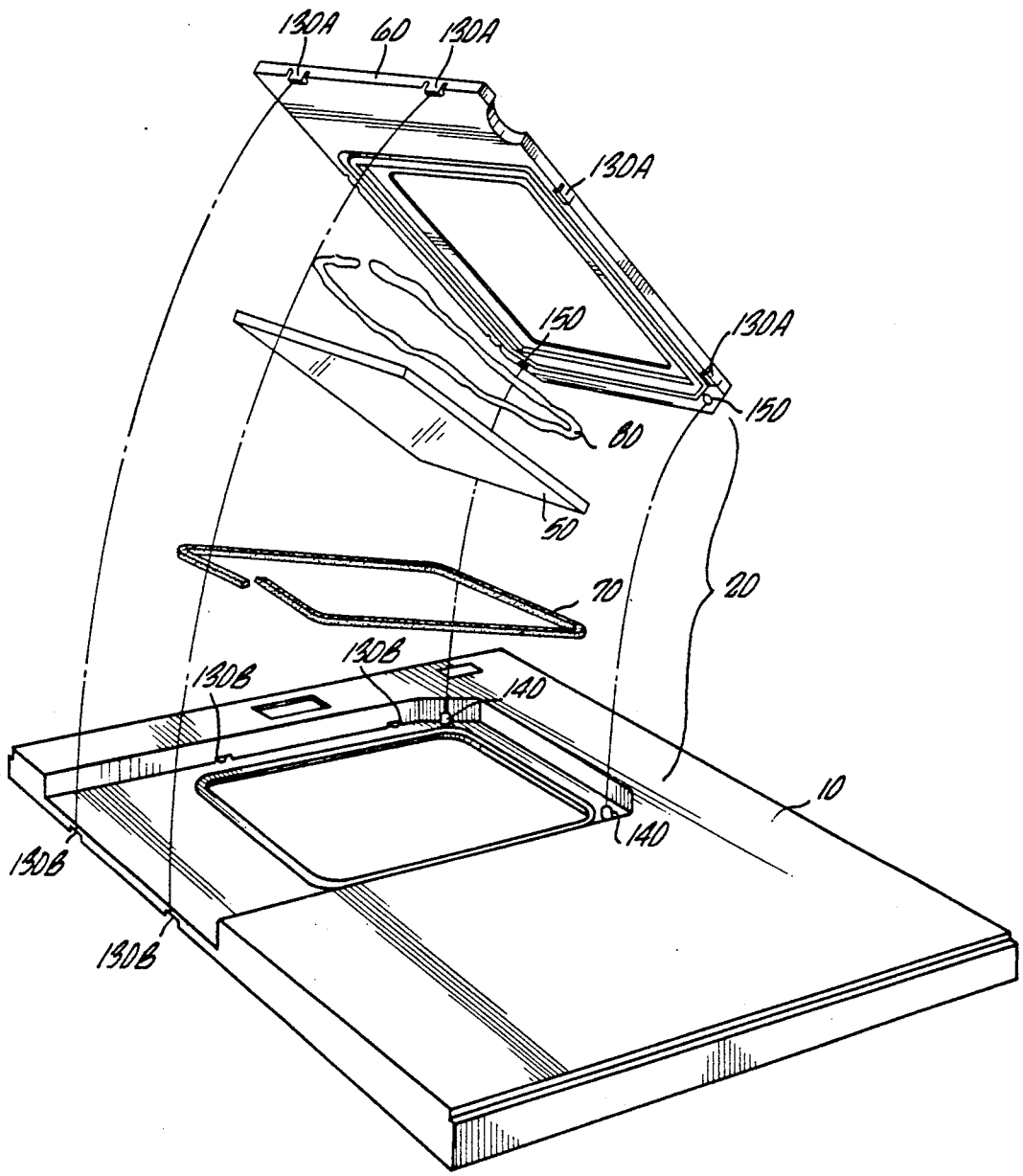
FIG. 1 is an exploded top perspective view of a scanner top plate with a removable top window according to the present invention.
Figure 5:
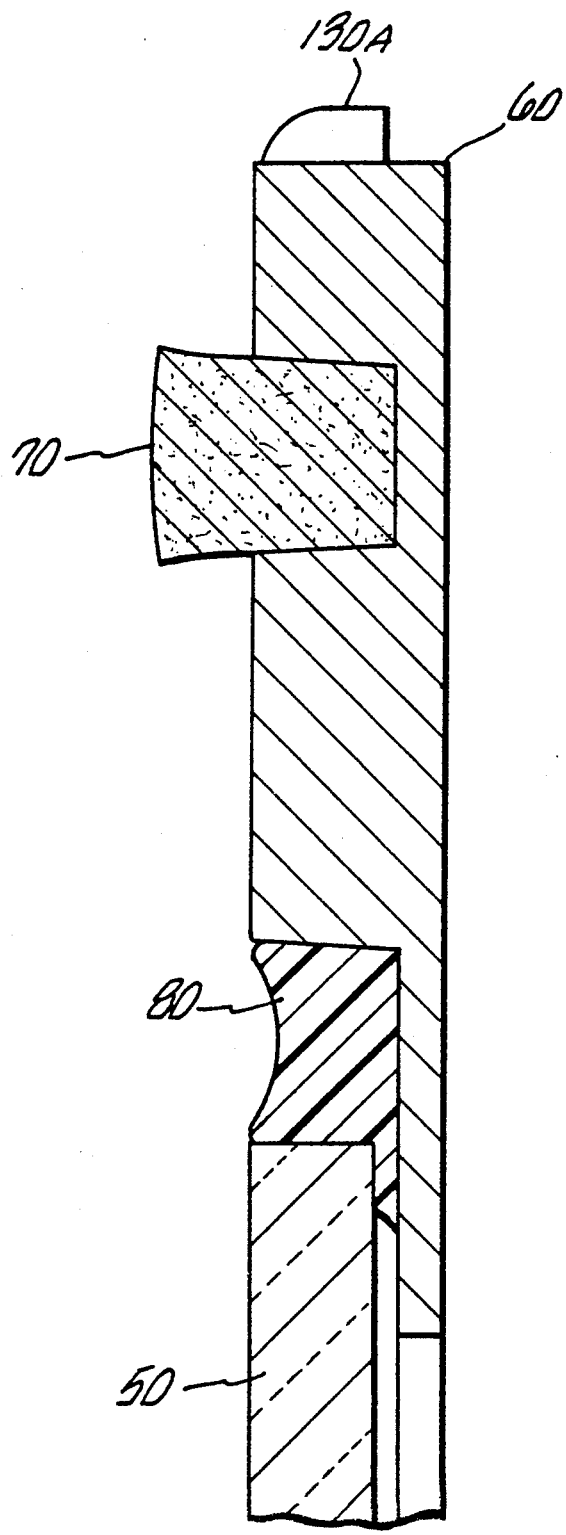
FIG. 5 is an enlarged cross-sectional view of area B of FIG. 4.

Turning to FIG. 1 of the drawings, an exploded top perspective view of a scanner top plate 10 and window cartridge assembly 20 is shown. In a preferred embodiment, scanner top plate 10 is fastened to the top of an optical scanner unit (shown as 30 in FIG. 8). Scan lines generated by optical scanner 30 are projected through a first window 40 ("lower window") in the optical scanner and then through a second window 50 ("upper window") in the window cartridge assembly. Items bearing information to be scanned, such as, for example, Universal Product Code Information, may be passed over second window 50. The scan lines will reflect off of the information to be scanned and back through windows 50 and 40 where detectors will decode the information for further processing. Scanners of this type are described in more detail in U.S. Pat. Nos. 4,713,532 and 4,093,865 which are incorporated herein by reference.

In a preferred embodiment of the present invention window cartridge assembly 20 comprises window cartridge 60, second window 50, seal ring 70 and window adhesive 80. Second window 50 is permanently bonded to window cartridge 60 with window adhesive 80. Second window 50 may be manufactured of tempered glass, regular glass, sapphire, a coated glass, or other optically transmissive material. Window cartridge 60 is, in a preferred embodiment, manufactured of injection molded plastic. As used in a preferred embodiment, second window 50 lies above and parallel to first window 40 which is typically permanently bonded to optical scanner 30 with a silicone based adhesive. A gap or space 90 remains between first window 40 and second window 50 as can be seen in FIG. 7. In order to form a seal to exclude contaminants from the gap 90, seal ring 70 is supplied and restrained within a groove 100 in window cartridge 60. Optionally seal ring 70 may be glued to cartridge 60 with an adhesive. In a preferred embodiment, seal ring 70 is fabricated of silicone foam. Other materials may be used but the seal ring material should preferably be compressible, hydrophobic, soft and durable. When window cartridge assembly 20 is inserted into scanner top plate 10 as illustrated in FIG. 6, seal ring 70 forms a seal between first window 40 and second window 50 which acts to protect first window 40 from becoming contaminated or dirty due to a spill of material in the vicinity of the optical scanner. The preferred hydrophobic nature of seal ring 70 will tend to repel and not absorb the majority of materials likely to be spilled in a typical supermarket. Were the window seal to be used in another environment, the seal ring material could be selected with a view to excluding the most likely materials to be spilled on or near the scanner.

A bead of UV (ultraviolet light) curable adhesive 80 which in a preferred embodiment is Loctite Nuvasil 83 U. V. Adhesive available from the Loctite Company is used to bond second window 50 to window cartridge 60. The adhesive bead may then be cured by exposure to ultraviolet light in a manner consistent with the adhesive manufacturer's instructions. In a preferred embodiment the bead may be cured by placing the assembly in an Ultraviolet Conveyor type oven such as the Model 612-R manufactured by Lightwave Energy Systems Company, Inc. of Redondo Beach, Calif. 90277. In a preferred embodiment, a power supply (model P-150) and a blower (model K-323/2) both manufactured by Fusion Systems, 12140 Parklawn Drive, Rockville, Md. 20852 are utilized in conjunction with the oven in the conventional manner. The conveyor oven is set, in a preferred embodiment, to move the assemblies by the UV light source at 10.0 feet per minute.

Turning now to FIGS. 6 and 7 a first preferred embodiment of the present invention is depicted wherein seal ring 70 is in contact with window cartridge 60 and first window 40. In a second preferred embodiment of the present invention as depicted in FIGS. 8 and 9, seal ring 70 may be in contact with window cartridge 60 and a rim 110 about first window 40. In either embodiment, a seal is effected which inhibits the flow of unwanted material and contaminants deposited on top of the scanner assembly 120 toward the gap 110 and/or the top of first window 40 while allowing window cartridge assembly 20 to be removable from scanner top plate 10. It is to be understood that window cartridge assembly 20 is insertable into scanner top plate 10 in a preferred embodiment whereby window cartridge assembly 20 is restrained by snap fasteners 130A, 130B as is well known in the art. Pins 140 position holes 150 in window cartridge assembly 20 as well known in the art.

While embodiments and applications of this invention have been shown and described, it would be apparent to those of skill in the art that many more modifications are possible without departing from the inventive concepts herein. The invention, therefore, is not to be restricted except in the spirit of the appended claims.

I claim:
1. An optical scanner comprising:
   a top plate;
   a first window permanently bonded to the optical scanner through which scan lines may be transmitted, said first window having a first surface and a second surface;
   a window cartridge assembly inserted into said top plate and restrained in place by means of snap fasteners;
   said window cartridge assembly including:
      a window cartridge;
      a second window having a third surface and a fourth surface;
      a seal ring attached to and downwardly depending from said window cartridge and surrounding said third surface;
      said first window substantially parallel to said second window and spaced apart from said second window to form a substantially transparent gap between said first window and said second window and adjacent said second surface and said third surface;
      said seal ring substantially in contact with said second surface.

2. An optical scanner comprising:
   a top plate;
   a first window permanently bonded to the optical scanner through which scan lines may be transmitted, said first window having a first surface and a second surface;
   a window cartridge assembly inserted into said top plate and restrained in place by means of snap fasteners;
   said window cartridge;
   a second window having a third surface and a fourth surface;
   a seal ring attached to and downwardly depending from said window cartridge and surrounding said third surface;
   said first window substantially parallel to said second window and spaced apart from said second window to form a substantially transparent gap between said first window and said second window and adjacent said second surface and said third surface;
   said seal ring substantially in contact with a portion of the optical scanner surrounding said first window.

3. An optical scanner according to claim 1 wherein said seal ring is permanently bonded to said window cartridge.

4. An optical scanner according to claim 2 wherein said seal ring is permanently bonded to said window cartridge.

5. An optical scanner according to claim 1 wherein said seal ring comprises silicone foam.

6. An optical scanner according to claim 2 wherein said seal ring comprises silicone foam.

7. A window cartridge assembly comprising:
   a window cartridge;
   a window permanently bonded to said window cartridge with an adhesive, said window having a top surface and a bottom surface;
   a seal ring attached to and downwardly depending from said window cartridge adjacent to and surrounding said bottom surface;
   said seal ring comprising hydrophobic foam;
   the window cartridge assembly including snap fasteners for restraining said window cartridge within a top plate of an optical scanner.

8. A window cartridge assembly according to claim 7 wherein said hydrophobic foam is silicone foam.

* * * * *

UNITED STATES PATENT AND TRADEMARK OFFICE
CERTIFICATE OF CORRECTION

PATENT NO. : 5,042,821
DATED : August 27, 1991
INVENTOR(S) : BONTLY

It is certified that error appears in the above-identified patent and that said Letters Patent is hereby corrected as shown below:

In claim 2 (col. 4, line 30) delete "said window cartridge;" and insert therefor:

-- said window cartridge assembly including:

a window cartridge; --

Signed and Sealed this

Eighth Day of June, 1993

Attest:

Attesting Officer

MICHAEL K. KIRK

Acting Commissioner of Patents and Trademarks